United States Patent Office 3,432,432
Patented Mar. 11, 1969

3,432,432
PERFLUOROPOLYETHER GREASES THICKENED WITH METAL-FREE PHTHALOCYANINE
John L. Dreher, Berkeley, Calif., assignor to Chevron Research Company, San Francisco, Calif., a corporation of Delaware
No Drawing. Filed Feb. 10, 1967, Ser. No. 615,089
U.S. Cl. 252—25              9 Claims
Int. Cl. C10m 3/26, 7/30

ABSTRACT OF THE DISCLOSURE

Grease comprising perfluoropolyether base and, in quantities sufficient to produce proper grease consistency, metal-free phthalocyanine.

BACKGROUND OF THE INVENTION

This invention is related to greases capable of prolonged lubrication at very high temperatures in the presence of oxidizing atmospheres. More particularly, it relates to perfluoropolyether fluids thickened with metal-free phthalocyanines.

With the development of modern high-speed mechanisms, and most especially equipment accessory to aircraft designed to reach supersonic speeds, operating temperatures of 500–600° F. and higher are often encountered. This is particularly so in the case of the jet aircraft engines proposed for use in the Mach 3 aircraft, such as the supersonic transport that is being planned for the near future. Conventional lubricants, such as those having mineral oil or silicone bases, have proved inadequate in providing proper lubrication at these elevated temperatures. Recently, new fluid materials which are capable of carrying much higher loads at elevated temperatures than the silicone base material have been developed. In addition to their high temperature performance, the fluids remain sufficiently liquid at ambient temperatures so that proper lubrication is provided over a wide range. Specifically the materials are perfluoropolyethers. Examples of the materials of this type are the PR-143 fluids developed by the Du Pont Company.

In order that a grease may be suitable for use at high temperatures, however, it is necessary that not only the base fluid be of such nature that it will withstand the temperature, but also, a grease thickening agent must be employed that will allow the grease to operate within the elevated temperature range. Thus, the thickener must provide the grease with a dropping point sufficiently high that a proper grease consistency is maintained (the lubricant will not melt and flow from the surface being lubricated), but, in addition, the thickener itself must be resistant to oxidation and other effects of the high temperature, thus guaranteeing that lubrication will continue for extended periods without hardening and cracking, effects which greatly diminish the lubricating function of the grease. Previously, fluorocarbon telomer thickeners have been employed.

Phthalocyanines, particularly metal-containing materials, and most particularly copper phthalocyanines, have been employed in the past as thickening agents in mineral oils and silicone fluids. For example, U.S. Patent 2,597,018 discloses greases thickened with phthalocyanines, preferably copper phthalocyanines.

SUMMARY OF THE INVENTION

It has now been found that superior high-temperature greases may be compounded from a major portion of a perfluoropolyether and a minor portion, sufficient to produce proper grease consistency, of metal-free phthalocyanine. Additionally, it has been found that the further addition of a minor portion of sodium nitrite to the greases results in further improvement in the high-temperature stability of the grease.

The base materials of the greases are, as previously noted, perfluoropolyethers. The polymers are comprised of monomer units of two to eight carbon atoms, with the preferred materials being prepared from two to three carbon atom monomers. In order that the materials be of proper consistency for fluid bases for the greases, it is preferred that there be no more than about 35 monomer units. Reference to the polymers and their preparation may be found in U.S. Patents 3,214,478, 3,242,218, 3,257,466, and 3,274,239. Although the preferred polymers consist entirely of perfluorocarbonether monomer units, materials which are capped by other groups are suitable. A description of the preferred base materials, which are Du Pont PR-143 fluids, may be found in ASLE Paper No. 65LC-3, Lubrication Conference, Oct. 18–20, 1965, Academic Press, entitled, "PR-143-A New Class of High-Temperature Fluids," by William H. Gumpricht. These fluids are colorless and odorless, have high densities and low indices of refraction. The fluids are basically polymers of hexafluoropropylene oxide.

The phthalocyanine, which is employed as a thickener in the grease compositions, is the metal-free material and is used as a dyestuff and is commercially available. It is employed in the grease in amounts sufficient to produce proper grease consistencies; amounts of from 5 to 50% by weight are usually sufficient. Amounts of from 10 to 25% are preferred.

Sodium nitrite, which is used to extend the high temperature performance of the greases, is optionally employed. It is used in amounts of from about 0.10 to 5.00% by weight; amounts of from about 0.2 to 2.0% by weight are preferred.

The greases may be prepared by a variety of procedures. For example, the phthalocyanine thickener may be dispersed in the base fluid by the aid of such mechanical devices as paint mills, colloid mills, pressure extrusion devices, etc. A dispersing agent for the thickener may be employed. The agent, usually an aromatic solvent, is then removed by evaporation.

DESCRIPTION OF PREFERRED EMBODIMENTS

The following examples illustrate the preparation of the grease compositions of the invention:

Example I.—Preparation of phthalocyanine thickened perfluoropolyether grease 400.5 g. (89% by weight) of perfluorocarbon (Du Pont PR-143-AC) and 49.5 g. (11% by weight) of phthalocyanine were placed in a 400-milliliter beaker. The mixture was heated with stirring to 390° F. and maintained with stirring at that temperature for 10 minutes. The material was allowed to cool. It was then milled three times on a three-roll lab mill. The mixture was then allowed to stand overnight; it was stirred slowly with a spatula for five minutes and allowed to stand overnight again. The yield was a smooth, blue-colored grease having an ASTM Worked Penetration of 270.

Example II.—Preparation of perfluoropolyether grease thickened with copper phthalocyanine The procedure of Example I was repeated employing copper phthalocyanine thickener (Copper Phthalocyanine Blue Toner, Holland-Suco Color Company) instead of metal-free phthalocyanine. A blue grease resulted having an ASTM Worked Penetration of 325.

Example III.—Preparation of perfluoropolyether grease with sodium nitrite rust inhibitor The general procedure of Example I was followed except that 0.5% by weight of sodium nitrite replaced a like amount of the base fluid. The nitrite addition was accomplished by dissolving it in several milliliters of water, adding the solution to the fluid-phthalocyanine mixture, from which the water was driven off at 370° F. The procedure yielded a blue-colored grease material having an ASTM Worked Penetration of 277.

Example IV.—Preparation of silicone grease thickened with phthalocyanine

For purposes of comparison, a grease produced from a silicone fluid containing the metal-free phthalocyanine thickener was also employed. The composition of this grease is as follows:

| | Percent by weight |
|---|---|
| Dow-Corning, DC510 (50 centistokes) | 50 |
| Dow-Corning, DC510 (100 centistokes) | 26.5 |
| Phthalocyanine | 23.0 |
| Sodium nitrite | 0.5 |

The grease had an ASTM Worked Penetration of 290.

Example V.—Commercial perfluoropolyether grease

Also for purposes of comparison, samples of a commercially available grease containing the same perfluoropolyether base fluid as in Examples I–III were tested. The grease was thickened with a fluorocarbon telomer.

In order to show the excellent high-temperature performance of the metal-free phthalocyanine thickened material, the samples were subjected to a high-speed bearing test, Federal Test Method Standard 791A-331. A brief description of the test is as follows: A ball bearing lubricated by the subject grease and containing heat-treated ball bearings is operated at 10,000 r.p.m. continuously for 22 hours at 500° F. The apparatus is then cooled to room temperature during a period of two hours. This procedure of operating and cooling is repeated until there is bearing failure. "Bearing Life" is the number of hours to bearing failure.

Data from the high-speed Bearing Test using the greases of Examples I–V are included in the following table.

TABLE I

| Grease type: | Bearing life (hrs.), 500° F.—10,000 r.p.m. |
|---|---|
| Metal-free phthalocyanine in perfluoropolyether (Example I) | 1543 |
| Metal-free phthalocyanine in perfluoropolyether 0.5% NaNO₂ (Example II) | 2498 |
| Copper phthalocyanine in perfluoropolyether (Example III) | 378 |
| Metal-free phthalocyanine in silicone base (Example IV) | 295 |
| Fluorocarbon telomer in perfluoropolyether (Example V)[1]— | |
| Sample 1 | 628 |
| Sample 2 (different lot) | 748 |

[1] Upon disassembly of the apparatus at the end of the tests run with the greases containing fluorocarbon telomer thickeners, excessive corrosion was noted and extensive overhaul of the test equipment was required. This corrosion was not noted in the cases where the metal-free phthalocyanine was employed as a thickener.

It may be seen from these data that the perfluoropolyether base grease thickened with metal-free phthalocyanine gives surprisingly longer bearing life than the grease employing the copper phthalocyanine thickener. In addition, it may be seen that the silicone base grease does not achieve an extraordinary bearing life using the metal-free phthalocyanine thickener.

Data were obtained from a comparison of several greases in a high-temperature, high-load, low atmospheric pressure test that was designed to duplicate operating conditions of mechanical equipment at 70,000 feet altitude, conditions expected to be encountered in the operation of the supersonic aircraft previously mentioned.

A brief description of the test is as follows: A Fafnir AW6–AK (440C) bearing is oscillated over an amplitude of 25° at a rate of 36 cycles/min. under a constant load of 375 pounds. The temperature is maintained at 500° F. and the atmospheric pressure at 0.5 p.s.i. (duplicating pressure at 70,000 feet pressure). The bearing is lubricated with the subject grease, and the number of cycles to bearing failure is recorded. The results of these tests with cycles recorded in millions are set forth in Table II.

TABLE II.—HIGH ALTITUDE SIMULATED HIGH TEMPERATURE OSCILLATING BEARING TEST

| Grease type: | Bearing life, millions of cycles |
|---|---|
| Unlubricated bearing | 0.102. |
| Metal-free phthalocyanine in perfluoropolyether base (Example I) | 1.600; 1.633; 2.292; avg. 1.841. |
| Commercially available grease—fluorocarbon telomer in perfluoropolyether (Example V) | 0.639; 0.840; avg. 0.738. |
| Commercially available high temperature grease having fluorinated phenylsilicone base | 0.440. |
| Commercially available high temperature grease (composition unknown) | 0.328. |

These data clearly show the outstanding superiority of the perfluoropolyether greases thickened with metal-free phthalocyanine when the greases are subjected to extremes of high temperature and low pressure. It may be noted that the phthalocyanine-thickened material gave a bearing life almost three times that of the grease containing identical base material with a fluorocarbon telomer thickener.

I claim:
1. A grease composition comprising a major portion of perfluoropolyether base fluid and a minor portion, sufficient to thicken said fluid to the consistency of a grease, of metal-free phthalocyanine.
2. The grease composition of claim 1 in which the perfluoropolyether fluid is a polymer of perfluoropolyether monomer units of 2 to 8 carbon atoms.
3. The grease composition of claim 2 in which the monomer units contain from 2 to 3 carbon atoms.
4. The grease composition of claim 3 in which the polymer contains from about 2 to 35 monomer units.
5. The grease composition of claim 2 in which the metal-free phthalocyanine is present in the amount of from about 5 to about 50% by weight.
6. The grease composition of claim 5 in which the metal-free phthalocyanine is present in the amount of from about 10 to about 25% by weight.
7. The grease composition of claim 4 in which the perfluoropolyether contains primarily perfluoropropylene ether monomer units.
8. The grease composition of claim 1 which contains, additionally, from about 0.10 to 5.0% by weight of sodium nitrite.

9. The grease composition of claim 8 in which the sodium nitrite is present in the amount of from 0.2 to 2% by weight.

References Cited

UNITED STATES PATENTS

| | | | |
|---|---|---|---|
| 2,597,018 | 5/1952 | Merker et al. | 252—50 |
| 3,214,478 | 10/1965 | Milian | 252—54 |
| 3,242,218 | 3/1966 | Miller | 252—54 |
| 3,257,466 | 6/1966 | Mashburn | 252—65 |

DANIEL E. WYMAN, *Primary Examiner.*

I. VAUGHN, *Assistant Examiner.*

U.S. Cl. X.R.

252—51.5, 54